United States Patent
Dupont et al.

(10) Patent No.: US 10,550,515 B2
(45) Date of Patent: Feb. 4, 2020

(54) METHOD FOR DEINKING RECYCLED PAPER

(71) Applicant: COATEX, Genay (FR)

(72) Inventors: Francois Dupont, Lyons (FR); Jerome Blanc, Brignais (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/568,107

(22) PCT Filed: May 30, 2016

(86) PCT No.: PCT/FR2016/051282
§ 371 (c)(1),
(2) Date: Oct. 20, 2017

(87) PCT Pub. No.: WO2016/193604
PCT Pub. Date: Dec. 8, 2016

(65) Prior Publication Data
US 2018/0105983 A1    Apr. 19, 2018

(30) Foreign Application Priority Data
Jun. 2, 2015 (FR) ..................................... 15 54992

(51) Int. Cl.
*D21C 5/02* (2006.01)
*D21H 21/08* (2006.01)
*D21H 11/14* (2006.01)

(52) U.S. Cl.
CPC ............. *D21C 5/027* (2013.01); *D21H 11/14* (2013.01); *D21H 21/08* (2013.01)

(58) Field of Classification Search
CPC .......... D21C 5/02; D21C 5/027; D21C 5/025; D21C 5/022; D21H 1/14; D21H 21/08; Y02W 30/648
See application file for complete search history.

(56) References Cited

U.S. PATENT DOCUMENTS

| | | | |
|---|---|---|---|
| 4,043,908 A * | 8/1977 | Roberts | D21C 5/027 162/5 |
| 4,276,118 A * | 6/1981 | Quick | B41M 7/0009 162/5 |
| 4,599,190 A | 7/1986 | Maloney | |
| 4,643,800 A * | 2/1987 | Maloney | D21C 5/027 162/5 |
| 5,415,733 A * | 5/1995 | Robinson | D21C 5/025 162/5 |
| 5,632,857 A * | 5/1997 | Larson | D21C 5/027 162/4 |
| 5,746,885 A * | 5/1998 | Stockwell | C08F 220/18 162/5 |
| 6,111,009 A | 8/2000 | Stockwell et al. | |
| 2007/0246175 A1 * | 10/2007 | Horacek | D21C 5/025 162/5 |
| 2018/0105983 A1 * | 4/2018 | Dupont | D21C 5/027 |

FOREIGN PATENT DOCUMENTS

| | | | |
|---|---|---|---|
| WO | WO-9321376 A1 * | 10/1993 | ............ D21C 5/025 |
| WO | WO-9512026 A1 * | 5/1995 | ............ D21C 5/025 |
| WO | 96/16223 A1 | 5/1996 | |
| WO | 2011/030003 A1 | 3/2011 | |

OTHER PUBLICATIONS

International Search Report dated Aug. 3, 2016 in PCT/FR2016/051282 filed May 30, 2016.

* cited by examiner

*Primary Examiner* — Jose A Fortuna
(74) *Attorney, Agent, or Firm* — Oblon, McClelland, Maier & Neustadt, L.L.P.

(57) ABSTRACT

A method for deinking recycled paper, including a pulping step, and then a flotation step, which includes introduction of at least one dispersant of the polyacrylate type, representing from 0.05 to 3.5 wt % of the mineral fillers of the recycled paper. A specific dispersant is used during the flotation step of the method for deinking recycled paper.

13 Claims, No Drawings

METHOD FOR DEINKING RECYCLED PAPER

FIELD OF THE INVENTION

The present invention relates to a method for deinking, decolorizing, disinfecting and bleaching recycled papers. It also relates to the use of a special dispersant in a method of deinking comprising at least one flotation step. Thus, the invention applies to all deinking plants using the method of flotation with dispersed (or circulating) air.

The large-scale recycling of paper and cardboard is now a reality throughout the world, since recycled fibers represent about half of the fiber resource needed for global production.

Among the steps of the recycling process, deinking is applied for recycling printed papers, and aims to remove the ink from the suspension of recycled paper.

The conventional methods of deinking find application in the treatment of recycled paper from used paper that is to be recycled. It is notably a question of treating paper, such as old newspapers, journals, illustrated magazines, computer listings, continuous forms and optionally photocopies. In the context of the present application, the expression "recycled paper" means generally all types of paper comprising cellulose fibers, mineral fillers and of course ink, the latter being present in a tiny amount relative to the mineral fillers and the fibers. When this waste pulp has been recycled, it only contains a greatly reduced amount of mineral fillers, for example less than 10% of mineral fillers when initially the dry matter of the recycled paper contained 28% of said fillers.

Depending on the nature of the paper to be recycled, the proportion of mineral fillers may thus vary from 5 to 60 wt %, the remainder being cellulose and organic manufacturing admixtures (latex, starch, antifoaming agents, dyes etc.).

PRIOR ART

The recycled paper is made into a suspension in a device called a "pulper". The latter contains a medium consisting of water, said recycled paper and at least one deinking agent. It is also possible to add soda and hydrogen peroxide to the pulper. The whole is stirred/mixed for a specified time, in order to obtain a pulp, from which we aim to remove at least the ink in order to obtain recycled waste pulp that is ready to be used again, for example in the manufacture of printing or writing paper.

Removal of the ink from recycled paper is carried out essentially by the method of flotation with dispersed (or circulating) air. When air bubbles are added to this suspension, which is the principle of flotation, the ink particles will have a natural tendency to be adsorbed at their interface. The air bubbles then transport them to the surface, generally forming a foam with a high concentration of ink.

There are many types of flotation apparatus, which are notably described in documents EP 0 674 040, DE 3524071 or EP 0 305 251.

The flotation step may be repeated several times in succession, for example in different chambers arranged in line, treating the suspension received from the preceding chamber, in order to obtain a waste pulp having the desired level of whiteness. The whiteness of paper is defined by international standard ISO 2470-2: 2008, which defines said whiteness with a value from 0 to 100, the latter value defining an optimal whiteness of pulp.

Each end use of the paper requires a specific whiteness. The more flotation steps the suspension of waste pulp undergoes, the higher the level of whiteness obtained. However, a high level of whiteness is obtained at the expense of the recycling yield, i.e. the amount of recycled waste pulp decreases when we want to obtain a whiter recycled pulp. In other words, for a given amount $m_o$ of paper to be recycled, an amount $m_1$ of recycled waste pulp will be obtained that is less than the amount $m_2$ if the desired whiteness for the paper $m_1$ is greater than the whiteness of the (recycled) waste pulp $m_2$.

The successive flotation steps lead to the gradual removal of the mineral fillers, in addition to the larger decrease of the ink (and resultant increased whiteness of the recycled waste pulp). In fact, the ink is bound to the mineral fillers, notably in the case of coated papers, and the flotation step entrains both the ink and the mineral fillers into the upper phase (classically present in the form of foam), this phase being extracted in order to remove the ink.

Now, the presence of these mineral fillers at a sufficient level is necessary in all applications where the paper must have functions or a particular texture, for example a bright appearance, opacity, a certain density and good printability for various printing processes.

At present, because the mineral fillers are largely removed, it is necessary to add said fillers to the recycled waste pulp again when the latter is intended for such applications. This represents a considerable additional cost (cost of materials and process for incorporation), and it would therefore be particularly advantageous, when recycling recycled paper, to be able to preserve the mineral fillers in sufficient quantity in the recycled waste pulp.

Document WO 96-16223 discloses a method for deinking paper for flexographic printing. The paper is disintegrated in the presence of an emulsion of particles of a polymer which is a polymer with a hydrophobic character and therefore is not water-soluble.

Document U.S. Pat. No. 4,599,190 describes the use of a low-molecular-weight polyelectrolyte dispersant in methods for secondary deinking of fibers in paper. This method does not comprise a flotation step.

Document WO 2011-030003 relates exclusively to the deinking of inks for inkjet printing by means of a specific enzyme, which is a laccase. No polyacrylate dispersant is used.

Thus, at present there is no system that is able to remove inks while preserving a sufficient quantity of the mineral fillers in the waste pulp. The applicant intends to propose a solution for filling this gap.

BRIEF DESCRIPTION OF THE INVENTION

In the context of the present invention, it was demonstrated that it is possible, in the flotation step, to separate the mineral fillers from the ink and, moreover, allow the latter to be carried preferentially into the upper phase, which is to be extracted. The invention notably involves the use of a specific dispersant, of the polyacrylate type, used in defined proportions, which promotes retention of the mineral fillers in the lower phase (which is kept) during flotation, while allowing the ink to go into the upper phase (which is extracted or removed).

This is particularly advantageous, bearing in mind that a person skilled in the art knows that the ink and the mineral fillers are bound to one another in the waste pulp.

Moreover, the nature of inks is extremely variable, more precisely the different types of ink have either a hydrophilic nature (water-based inks, for example of the flexo or inkjet type) or a hydrophobic nature (such as the inks for offset printing and heliogravure or toners). Thus, it is advantageous for such a dispersant to be capable of separating the inks and the mineral fillers that are initially bound to one another while being able to keep just the material fillers in the lower flotation phase (which is kept).

Besides this ability to separate the inks and the mineral fillers in the two separate phases created during flotation, the present invention also allows a very significant improvement of the recycling yield (mass of recycled waste pulp, compared to the initial mass of recycled paper, taking into account a level of whiteness to be attained).

Thus, the present invention relates to a method for deinking recycled paper, comprising:
- a pulping step consisting of putting said recycled paper into suspension with at least water to form a pulp, then
- a flotation step consisting of circulating air bubbles in at least one chamber receiving said pulp, diluted in aqueous solution, so as to form two adjacent phases, the upper phase containing the ink and intended to be removed,
- a step of introducing at least one deinking agent during the pulping step and/or the flotation step,
said method further comprising a step of introducing at least one dispersant of the polyacrylate type, in an amount varying between 0.05 and 3.5 wt % relative to the weight of the mineral fillers of the recycled paper.

It is to be understood here that the expression "recycled paper" describes all types of paper comprising cellulose fibers, mineral fillers and inks.

The expression "mineral fillers" means all the inorganic elements that are intended to opacify the paper (refractive index greater than cellulose), improve the printability and/or lower the manufacturing costs of the paper (less energy for drying, lower cost of materials), such as calcium carbonate, titanium oxide, kaolin and/or talc.

"Dispersant of the polyacrylate type" means a (meth) acrylic acid polymer having a dispersing function when it is added to a suspension comprising mineral fillers. The dispersant according to the present invention is defined more precisely hereunder.

Other advantageous features of the invention are stated below:
- according to one embodiment, at least one part of said dispersant of the polyacrylate type is introduced during the pulping step;
- according to one embodiment, more than half of the aforesaid dispersant is introduced during the so-called flotation step, for example the whole amount of the dispersant is introduced during said flotation step;
- according to one embodiment, said dispersant of the polyacrylate type has a molecular weight between 2000 g·mol$^{-1}$ and 100 000 g·mol$^{-1}$, preferably between 3000 g·mol$^{-1}$ and 10 000 g·mol$^{-1}$, as determined by SEC;
- according to one embodiment, said dispersant is introduced during the pulping step in an amount varying between 0.25 and 3 wt % relative to the weight of the mineral fillers of the recycled paper, preferably between 0.8 and 2 wt % relative to the weight of the mineral fillers of said paper;
- according to one embodiment, soda and/or hydrogen peroxide are also added during the pulping step;
- according to one embodiment, the dispersant of the polyacrylate type is an acrylic acid homopolymer, optionally in neutralized form.

These various embodiments may be combined with one another.

Moreover, the invention relates to the use of a dispersant of the polyacrylate type in a method for deinking recycled paper, said dispersant being introduced during the method in an amount varying between 0.05 and 3.5 wt % relative to the weight of the mineral fillers of the recycled paper.

According to one embodiment, said method for deinking comprises a pulping step, a flotation step, a step of introducing at least one deinking agent, said dispersant of the polyacrylate type being introduced during the pulping step.

According to one embodiment, said dispersant is introduced during the method in an amount varying between 0.25 and 3 wt % relative to the weight of the mineral fillers of the recycled paper.

DETAILED DESCRIPTION OF THE INVENTION

Regarding the deinking agent, this consists of one or more foaming agents known by a person skilled in the art, for example a soap of fatty acid notably of the stearic or oleic type, a fatty acid or a mixture of fatty acids, a nonionic surfactant of the ethoxylated and/or propoxylated fatty alcohol type, a nonionic surfactant of the ethoxylated and/or propoxylated fatty acid type, various mixtures of surfactants and fatty acids, which may also be combined with enzymes, modified derivatives of the organosiloxane type.

Regarding the dispersant used in the context of the invention, it comprises polymers obtained from acrylic monomers. The acrylic monomer is selected from acrylic acid, methacrylic acid and mixtures thereof. Thus, the polyacrylate polymer obtained could be a homopolymer or a copolymer. It is a water-soluble polymer, not a polymer emulsion.

"Homopolymer or copolymer of (meth)acrylic acid" means either a polymer consisting exclusively of acrylic acid (acrylic acid homopolymer), or a polymer consisting exclusively of methacrylic acid (methacrylic acid homopolymer) or alternatively a polymer consisting of a mixture of acrylic acid and methacrylic acid (acrylic acid/methacrylic acid copolymer) and optionally of at least one other monomer unit. In the case of an acrylic acid/methacrylic acid copolymer, according to one aspect of the invention, the molar ratio of the monomers of acrylic acid to the monomers of methacrylic acid may vary between 1:100 and 100:1, for example between 1:1 and 100:1 or between 1:1 and 50:1.

Said monomer may be partially neutralized. Thus, in one embodiment variant, 2 to 50 wt % of the monomer of (meth)acrylic acid, relative to the total weight of the monomer of (meth)acrylic acid introduced, is neutralized. This may be achieved using a single neutralizing agent or several neutralizing agents. The monomer may, for example, be partially neutralized using an alkali-metal or alkaline-earth hydroxide, an alkaline-earth oxide, and/or with an amine. We may mention, as examples, sodium hydroxide, potassium hydroxide, lithium hydroxide, calcium hydroxide, magnesium hydroxide, calcium oxide, potassium oxide.

Moreover, the copolymer according to the invention may also further comprise one or more other ethylenically unsaturated monomer(s) selected from the group consisting of 2-acrylamido-2-methylpropane sulfonic acid (AMPS), maleic acid, fumaric acid, crotonic acid, itaconic acid, the unsaturated telomers of acrylic acid, the monomers of formula (I):

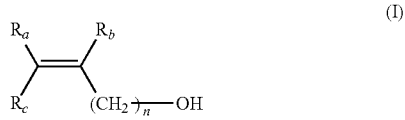

in which:

$R_a$, $R_b$ and $R_c$ represent, independently of one another, H or $CH_3$, n is an integer varying between 0 and 2 (i.e. 0, 1 or 2).

In particular, the monomer may be allyl alcohol (n=1), methallyl alcohol (n=1), isoprenol (n=2). Advantageously, isoprenol is used.

"Unsaturated telomers of acrylic acid" means oligomers of acrylic acid or of acryloxypropionic acid, of formula (II):

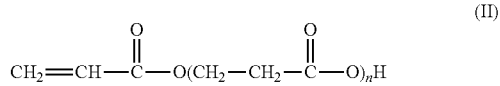

where n is an integer in the range from 1 to 10. These various oligomers may be mixed. When n=1, the oligomer is an acrylic acid dimer.

In the presence of other unsaturated monomer(s), according to one aspect of the invention, the molar ratio of the monomers of (meth)acrylic acid to the other unsaturated monomer(s) may vary between 1:1 and 100:1, for example between 1:1 and 75:1 or between 1:1 and 50:1.

Other chemical constituents may be added during the method for deinking, such as soda, hydrogen peroxide, sodium silicate and soap.

Apart from the use of a specific dispersant, in particular proportions during a step of the method for deinking, the method according to the invention is known by a person skilled in the art. More particularly, the recycled paper passes through a pulper, a plurality of purifiers and classifier stations, arranged at different places along the deinking chain, having the respective function of removing the heavy and large particles, as well as at least one—conventionally a plurality—flotation cell or chamber. Thus, the method for deinking according to the invention uses the stations and materials that are usually employed, without modifying them, but the invention is suitable for the flotation technique and not for the washing technique.

EXAMPLES

A plurality of tests that have demonstrated the invention relative to the prior art as well as its various particular features are presented below. For brevity and clarity, only a few results are presented, but of course the applicant has carried out many other tests and analyses in order to comprehend and evaluate the context of the invention as defined here.

Compounds Used in the Tests:

XP 1831 (according to the invention): dispersant of the polyacrylate type consisting of 100% of acrylic acid, with a molecular weight of 4000 g/mol (as determined by SEC), obtained by conventional methods of radical polymerization.

$ET_1$ (outside the invention): polymer of the comb type consisting of hanging chains of the poly(ethylene glycol) type with a molecular weight of about 50 000 g·mol$^{-1}$.

$ET_2$ (outside the invention): polymer of the comb type consisting of hanging chains of the poly(ethylene glycol) type with a molecular weight of about 100 000 g·mol$^{-1}$.

$ET_3$ (outside the invention): Potassium tripolyphosphate (KTPP).

Liptol® S100: deinking agent consisting of a surfactant of the ethoxylated/propoxylated fatty alcohol type marketed by the company CECA.

Molecular Mass (or Molecular Weight) Mw of the Dispersant of the Polyacrylate Type According to the Invention:

A technique of this kind employs liquid chromatography apparatus made by WATERS™, equipped with a detector. This detector is a detector of refractometric concentration made by WATERS™.

This liquid chromatography equipment is equipped with a size exclusion column suitably selected by a person skilled in the art for separating the different molecular weights of the polymers under investigation. The liquid phase for elution is an aqueous phase adjusted to pH 9 with 1N soda containing 0.05M of $NaHCO_3$, 0.1M of $NaNO_3$, 0.02M of triethanolamine and 0.03% of $NaN_3$.

In detail, according to a first step, the polymerization solution is diluted at 0.9% dry in the dissolution solvent for SEC, which corresponds to the liquid phase for elution for SEC, to which 0.04% of dimethylformamide is added, which performs the role of marker of flow rate or internal standard. Then it is filtered at 0.2 μm. 100 μL are then injected into the chromatography apparatus (eluent: an aqueous phase adjusted to pH 9.00 with 1N soda containing 0.05M of $NaHCO_3$, 0.1M of $NaNO_3$, 0.02M of triethanolamine and 0.03% of $NaN_3$).

The liquid chromatography apparatus contains an isocratic pump (WATERS™ 515), the flow rate of which is set at 0.8 ml/min. The chromatography apparatus also comprises a furnace, which in its turn comprises the following system of columns in series: a precolumn of the GUARD COLUMN ULTRAHYDROGEL WATERS™ type with a length of 6 cm and an inside diameter of 40 mm, and a linear column of the ULTRAHYDROGEL WATERS™ type with a length of 30 cm and an inside diameter of 7.8 mm. The detection system consists of a refractometric detector of the RI WATERS™ 410 type. The furnace is heated to a temperature of 60° C., and the refractometer is heated to a temperature of 45° C.

The chromatography apparatus is calibrated using standards of sodium polyacrylate in powder form with different molecular weights certified by the supplier: POLYMER STANDARD SERVICE or AMERICAN POLYMER STANDARDS CORPORATION. The test protocol consisted of adding these products as a supplement in a reference recipe including a deinking agent and adding the dispersant, either in the pulper ("concentrated" medium at 27% of dry matter in water) or in a flotation cell/chamber ("dilute" medium at 1% of dry matter in water).

A model HSM10 laboratory pulper made by Hobart® and a Delta® 25 flotation cell/chamber from the company Voith are used in the context of these tests.

The raw materials considered are identical for all the tests in order to verify that this parameter (raw materials) does not affect the results. It is a mixture based on newspaper (45%) and weekly magazines (55%) in order to obtain a mixture with a fairly high level of mineral fillers, of the order of 28% of the dry matter (the paper contains conventionally 10% of water, the latter having been removed by drying the aforesaid mixture in a heat chamber).

Similarly, chemical elements, of identical nature and amount for all the tests, were introduced in the pulper, namely:

soda NaOH at a rate of 6 kg of pure product per tonne of recycled paper, sodium silicate at a rate of 18 kg of commercial product per tonne of recycled paper, hydrogen peroxide at a rate of 7 kg of pure product per tonne of recycled paper, Liptol S100 at a rate of 0.5 kg of commercial product per tonne of recycled paper.

It should be pointed out that the tests were carried out with another deinking agent, namely a mixture of ethoxylated-propoxylated fatty alcohol and fatty acid of the oleic type, and showed results similarly to those observed with Liptol S100.

Tests Carried Out:

The method for deinking according to the invention is carried out, testing the various dispersants mentioned above, introducing them first in the pulping step, and in a second test in the flotation step. For all the tests, it is assumed that a whiteness of the recycled waste pulp of 56 and 59 must be obtained, and for each of these two levels of whiteness we determine the yield, i.e. the amount of recycled waste pulp (at the desired whiteness) relative to the initial amount of cellulose fibers present in the recycled paper dry matter (the result is expressed as a percentage).

As a reminder, the dry matter corresponds essentially to the cellulose fibers and the mineral fillers (as well as the inks), i.e. to the weight of the recycled paper after removal of the water and all the other ancillary materials (plastics, staples etc.). The dry matter corresponds to the portion of the recycled paper that is put in the pulper.

The tests are conducted in the laboratory, using 250 grams of recycled paper each time (i.e., assuming 10% of water present, 225 g of dry matter). In order to determine the time taken, in the flotation step, to obtain the desired level of whiteness (either 56, or 59), a preliminary analysis is carried out for each test, during which a sample is taken every minute, and its whiteness is measured. Once the flotation time has been determined for each of the tests, the test is repeated, leaving the flotation to continue until whiteness of 56 is obtained, and then a second time until whiteness of 59 is obtained. The yield is then found by determining the amount of matter recovered (recycled waste pulp) relative to the amount of dry matter initially present, i.e. of the order of 140 to 160 grams since the yields are of the order of about 60% to 70%.

In the table given below, the amounts of dispersants are shown as percentage by weight of the mineral fillers of the recycled paper, as is the traditional practice for dosing the deinking agent.

Results of the Tests Carried Out on the Test Specimens with the Various Formulations:

Besides the tests presented in the following table, complementary tests demonstrated that the molecular weight of the dispersant according to the invention has an influence on its effectiveness. Thus, it was demonstrated that the dispersant according to the invention needed a molecular weight between 2000 g·mol$^{-1}$ and 100 000 g·mol$^{-1}$ (gram per mole) and preferably (gain in yield) between 3000 g·mol$^{-1}$ and 10 000 g·mol$^{-1}$.

Moreover, in the method according to the invention, more than 35%, or even more than 40%, of the mineral fillers present in the recycled paper are preserved in the recycled waste pulp.

| Tests | XP 1831 | ET$_1$ | ET$_2$ | ET$_3$ | Yield (whiteness 56), pulping step | Yield (56), flotation step | Yield (59), pulping step | Yield (59), flotation step |
|---|---|---|---|---|---|---|---|---|
| 1 | 0.05 | | | | 67.9 | 65.7 | 61.8 | 59.8 |
| 2 | 0.15 | | | | 70.1 | 67.8 | 64.2 | 62.1 |
| 3 | 0.25 | | | | 73 | 70.6 | 68.3 | 66.0 |
| 4 | 0.35 | | | | 75.4 | 72.90 | 70.1 | 67.8 |
| 5 | 0.9 | | | | 77.3 | 74.7 | 71.5 | 69.1 |
| 6 | 1.1 | | | | 77.5 | 74.90 | 71.6 | 69.2 |
| 7 | 1.8 | | | | 77.4 | 74.8 | 70.2 | 67.9 |
| 8 | 2.3 | | | | 75.9 | 73.4 | 69.8 | 67.5 |
| 9 | 2.9 | | | | 72.9 | 70.5 | 67.9 | 65.6 |
| 10 | 3.2 | | | | 69.1 | 66.8 | 63 | 60.9 |
| 11 | | 0.9 | | | 66.5 | 63.4 | 60.2 | 58.3 |
| 12 | | | 0.9 | | 66.1 | 63.3 | 59.7 | 57.3 |
| 13 | | | | 0.9 | 66.2 | 63.0 | 60.4 | 58.0 |
| 14 | No dispersant | | | | 67.6 | 65.4 | 61.5 | 59.5 |

The invention claimed is:

1. A method for deinking recycled paper that comprises mineral filler, the method comprising:

pulping by putting recycled paper into suspension with at least water to form a pulp, then performing a flotation by circulating air bubbles in at least one chamber receiving the pulp, diluted in aqueous solution, so as to constitute two adjacent phases, an upper phase comprising ink and intended to be removed, and introducing at least one deinking agent during the pulping and/or the flotation, the method further comprising introducing a water-soluble dispersant of the polyacrylate type that is not in the form of a polymer emulsion, in an amount of 0.05 to 3.5 wt % relative to the weight of mineral filler in the recycled paper, during said pulping and/or said flotation.

2. The method according to claim 1, wherein at least a part of the dispersant is introduced during the pulping.

3. The method according to claim 1, wherein the dispersant has a molecular weight between 2000 g·mol$^{-1}$ and 100 000 g·mol$^{-1}$, as determined by size exclusion chromatography.

4. The method according to claim 1, wherein the dispersant is introduced during the pulping in an amount of 0.25 to 3 wt % relative to the weight of the mineral filler of the recycled paper.

5. The method according to claim 1, further comprising the addition of soda and/or hydrogen peroxide during the pulping.

6. The method according to claim 1, wherein the dispersant is an acrylic acid homopolymer, optionally in neutralized form.

7. The method according to claim 1, wherein at least a part of the dispersant is introduced during the flotation.

8. The method according to claim 1, wherein the dispersant is a polymer consisting of acrylic acid, a polymer consisting of methacrylic acid, or a polymer consisting of a mixture of acrylic acid and methacrylic acid.

9. The method according to claim 8, wherein the dispersant is a polymer consisting of acrylic acid.

10. A method for deinking recycled paper that comprises mineral filler, the method comprising introducing a water-soluble dispersant of the polyacrylate type that is not in the form of a polymer emulsion to recycled paper, in an amount of 0.05 to 3.5 wt % relative to the weight of mineral filler in the recycled paper, wherein the method further comprises pulping, flotation, and introduction of at least one deinking agent, the dispersant being introduced during the pulping.

11. The method according to claim 10, wherein the dispersant is introduced in an amount of 0.25 to 3 wt % relative to the weight of the mineral filler in the recycled paper.

12. The method according to claim 10, wherein the dispersant is a polymer consisting of acrylic acid, a polymer consisting of methacrylic acid, or a polymer consisting of a mixture of acrylic acid and methacrylic acid.

13. The method according to claim 12, wherein the dispersant is a polymer consisting of acrylic acid.

* * * * *